United States Patent
Jamison et al.

(10) Patent No.: US 9,635,034 B2
(45) Date of Patent: Apr. 25, 2017

(54) SYSTEM FOR AUTHORIZING ELECTRONIC COMMUNICATION OF CONFIDENTIAL OR PROPRIETARY DATA TO EXTERNAL ENTITIES

(71) Applicant: BANK OF AMERICA CORPORATION, Charlotte, NC (US)

(72) Inventors: Sean Jamison, Charlotte, NC (US); Diane Bomba, Charlotte, NC (US); Sorin N. Cismas, Addison, TX (US); Michelle Kaiser, Charlotte, NC (US); Manu Jacob Kurian, Dallas, TX (US); Katherine McDonald, Charlotte, NC (US); David Orr, Charlotte, NC (US); Marc Sandlhauser, Newark, DE (US); James P. Scopis, Newark, DE (US); Tom Van Beek, Charlotte, NC (US); David Weaver, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/588,430

(22) Filed: Jan. 1, 2015

(65) Prior Publication Data
US 2016/0197935 A1 Jul. 7, 2016

(51) Int. Cl.
*G06F 7/04* (2006.01)
*H04L 29/06* (2006.01)
(Continued)

(52) U.S. Cl.
CPC .......... *H04L 63/105* (2013.01); *G06F 21/577* (2013.01); *G06F 21/604* (2013.01);
(Continued)

(58) Field of Classification Search
USPC ..................................................... 726/26–30
See application file for complete search history.

(56) References Cited

U.S. PATENT DOCUMENTS

| 7,475,246 B1* | 1/2009 | Moskowitz | G06F 21/10 348/E7.056 |
| 8,341,389 B2* | 12/2012 | Filee | G06F 21/34 705/905 |

(Continued)

OTHER PUBLICATIONS

Addo et al., "A Reference Architecture for Improving Security and Privacy in Internet of Things Applications," 2014 IEEE International Conference on Mobile Services Year: 2014 pp. 108-115.*

(Continued)

*Primary Examiner* — Roderick Tolentino
(74) *Attorney, Agent, or Firm* — Michael A. Springs; Moore & Van Allen PLLC; James C. Edwards (57) ABSTRACT

A platform for providing authorization of electronic communication of secure data to external entities, e.g., vendors, third parties or the like based on an assessment of the data risk associated with communicating the data to the external entity. The secure data that is to be communicated, in the form of specific data items, are identified as well as the associated security standards. The external identity is assessed to ensure their capabilities to properly meet the enterprise/sender's information security, business privacy and continuity standards, along with applicable industry standards. Based on the results of the assessment, remediation action may be required to address critical vulnerabilities or recommendations may be presented to a decision-making entity to grant authorization to electronically communicate the data in question to the external entity. In response to granting authorization, secure communication channels are allocated and established to allow for communication of the data.

14 Claims, 4 Drawing Sheets

(51) Int. Cl.
*G06F 21/60* (2013.01)
*G06F 21/57* (2013.01)

(52) U.S. Cl.
CPC .......... *G06F 21/606* (2013.01); *H04L 63/029* (2013.01); *H04L 63/08* (2013.01); *H04L 63/1433* (2013.01)

(56) References Cited

U.S. PATENT DOCUMENTS

| | | | | |
|---|---|---|---|---|
| 2005/0068983 A1* | 3/2005 | Carter | ................... | H04L 63/102 370/480 |
| 2006/0272022 A1* | 11/2006 | Loukianov | ............ | G06F 21/575 726/26 |
| 2012/0023568 A1* | 1/2012 | Cha | ....................... | G06F 21/335 726/10 |
| 2013/0097698 A1* | 4/2013 | Taveau | ................... | G06Q 30/06 726/19 |
| 2013/0104190 A1* | 4/2013 | Simske | ................... | G06F 21/60 726/1 |
| 2013/0197998 A1* | 8/2013 | Buhrmann | ......... | G06Q 30/0255 705/14.53 |
| 2014/0130142 A1* | 5/2014 | Plewnia | ................ | G06F 21/335 726/5 |
| 2015/0058923 A1* | 2/2015 | Rajagopal | ............... | G06F 21/00 726/1 |

OTHER PUBLICATIONS

Celesti et al., "How the Dataweb Can Support Cloud Federation: Service Representation and Secure Data Exchange," 2012 Second Symposium on Network Cloud Computing and Applications Year: 2012 pp. 73-79.*

* cited by examiner

FIG. 4

SYSTEM FOR AUTHORIZING ELECTRONIC COMMUNICATION OF CONFIDENTIAL OR PROPRIETARY DATA TO EXTERNAL ENTITIES

FIELD

In general, embodiments of the invention relate to managing the communication of data and, more particularly, a system that authorizes electronic communication of confidential and/or proprietary data to an external entity, such as a vendor or other third party.

BACKGROUND

In large enterprise businesses, such as a financial institution, it is imperative that confidential and/or proprietary data be properly protected against exposure, otherwise referred to as a data breach. In the financial institution environment this includes customer data, such as social security numbers, names, addresses, telephone numbers and the like, as well as account related data, such as account numbers, account balances, transaction entries and the like.

In the large enterprise environment, the enterprise needs to not only ensure that their confidential/proprietary data is properly and securely protected internally (i.e., with the physical and network confines of the enterprise), but also the enterprise must ensure that confidential/proprietary data is properly secured by external entities that receive the data from the enterprise. In the financial institution setting, external entities may include vendors (i.e., entities in a contractual relationship with the financial institution) and other non-contracting third-party entities, for example, other financial institutions or the like. The financial institution must ensure that the external entity has the proper mechanisms, procedures and governance in place to not only receive confidential/proprietary data, but also properly store such data to prevent exposure. Moreover, in instances where the external entity, is implementing the Internet or a mobile platform to host the confidential/proprietary data, the financial institution, or any other enterprise, must ensure that the proper mechanisms, procedures and governance are in place to securely host the confidential/proprietary data. In this regard, the enterprise must be able to manage the risk of surrounding the use of the confidential/proprietary data by an external entity (i.e., outside of the enterprise's firewall).

Current practices within such large enterprises which seek to ensure protection of confidential/proprietary data by external entities tend to be unreliable and inconsistent. In this regard, assessments of the external entities by the enterprise tend to occur sporadically or reactively (i.e., in response to a compromise of the data at the external entity or the like). Moreover, proper procedures may not be in place at the enterprise to ensure that consistent review and approval of external entities occurs.

Therefore, a need exists to develop systems, apparatus, computer program products, methods and the like that provide a reliable and effective means for ensuring the protection, security and confidentiality of data that is electronically communicated to external entities. The desired systems, apparatus, computer program products, methods and the like should establish activities within the enterprise that ensure compliance to enterprise mandates and require external entities to implement enterprise-aligned information security policies, standards and/or baselines.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for authorizing electronic communication of confidential and/or proprietary data to external entities. In this regard the present invention relies on a triggering event, such as contract-related action (e.g., executing a contract or statement-of-work, modifying a contract, renewing a contract or the like) and the need for data to be transmitted as the impetus to initiating a validation process/assessment of the external entity. The external entity assessment requires knowledge of the data, specifically the data fields being communicated to the external entity and the mechanisms, procedures, governance and the like that the external entity has over the data once the data is received by the external entity. In the event that the external entity implements the data in an Internet or mobile application, the assessment may include proper mechanisms, procedures, governance to host the data in such a framework. If the results of the assessment show critical vulnerabilities, corrective actions must be implemented prior to recommending that data be authorized for communication. The results of the assessment are communicated to enterprise management, such as an information officer or the like, for granting/denying the right to electronically communicate the data to the external entity. Once approved, proper secure electronic communication channels are established to securely communicate the data to the external entity.

Additionally, embodiments of the present invention provide for ongoing assessments of the external entity throughout the life of the relationship between the external entity and the enterprise. Maintenance assessments or the like may be conducted on the external entity based on a predetermined time period lapses or the occurrence of a triggering event (e.g., a compromise at the external entity or the like). Off-boarding assessments or the like may be conducted on the external entity based on a triggering event, such as expiration/cancellation/invalidation of a contract. Such off-boarding assessments insure that data is properly and securely returned, purged or the like and that communication channels are terminated.

An apparatus for granting authorization to electronically communicate secure data to an external entity defines first embodiments of the invention. The apparatus includes a computing platform having a memory and at least one processor in communication with the memory. The apparatus further includes a data communication authorization module that is stored in the memory and executable by the processor. The module includes an external entity and secure data information-gathering application configured for, in response to a triggering event that requires electronic communication of secure data to an external entity, receiving user inputs that define first information associated with the external entity and second information associated with the secure data. The module further includes a validation application configured for managing a process for validating the external entity for electronically communicating the secure data to the external entity, such that the process for validating is based at least in part on the first and second information. In addition the module includes a data transmission application configured for, in response to validating the external entity and granting permission to communicate the secure data, establishing a secure communication channel to communicate the secure data to the external entity.

In specific embodiments of the apparatus, the process for validating the external entity further includes determining if (1) the external entity, (2) a data-hosting application implemented by the external entity to host the secure data, and (3) data elements in the secure data are currently approved for electronic communication of secure data to the external entity. In such embodiments of the apparatus, the process for validating the external entity may further include, based on the determination that at least one of (1) the external entity, (2) the data-hosting application, and (3) the data elements in the secure data are currently unapproved for electronic communication of secure data to the external entity, assessing control functions in place at one or more facilities associated with the external entity. In such embodiments of the apparatus, assessing the control functions further comprises verifying that the external entity meets or exceeds (1) internal information security standards, (2) internal business privacy standards, (3) internal continuity standards, and (4) industry standards. In other such embodiments of the apparatus the process for validating the external entity may further include assessing vulnerabilities associated with a data-hosting application (e.g., Internet-based, mobile or the like) implemented by the external entity to host the secure data.

In other specific embodiments of the apparatus, the triggering event that triggers the data communication authorization process is a contract-related activity or action, including one of (1) executing a new contract or statement-of-work with the external entity, (2) renewing a previously executed contract with the external entity, and (3) modifying an existing contract with the external entity.

In other specific embodiments of the apparatus, the data communication authorization module further includes a maintenance application configured for managing a maintenance process for assuring that the external entity remains a validated external entity for electronically communicating the secure data to the external entity. In such embodiments of the apparatus, the maintenance application may be further configured for, in response to a triggering action or expiration of a validation period, generating and communicating validation alerts that notify one or more parties that re-validation of the external entity is necessary.

In still further specific embodiments of the apparatus, the data communication authorization module further comprises an off-boarding application configured for, in response to a second triggering activity, managing a termination process that assures that the secure connection channel is deactivated. In such embodiments of the apparatus, the second triggering activity may be one of (1) a contract expiring, (2) cancellation of a contract, or (3) a security compromise by the external entity.

A method for granting authorization to electronically communicate secure data to an external entity defines second embodiments of the invention. The method includes, in response to a triggering event that requires electronic communication of secure data to an external entity, receiving, by a computing device processor, user inputs that define first information associated with the external entity and second information associated with the secure data. The method further includes managing a process for validating the external entity for electronically communicating the secure data to the external entity, such that the process for validating is based at least in part on the first and second information. In addition the method includes, in response to validating the external entity and granting permission to communicate the secure data, establishing a secure communication channel to communicate the secure data to the external entity.

In specific embodiments of the method managing the process for validating the external entity further includes determining, by a computing device processor, if (1) the external entity, (2) a data-hosting application implemented by the external entity to host the secure data, and (3) data elements in the secure data are currently approved for electronic communication of secure data to the external entity. In such embodiments of the method, managing the process for validating may further include, based on the determination that at least one of (1) the external entity, (2) the data-hosting application, or (3) the data elements in the secure data are currently unapproved for electronic communication of secure data to the external entity, assessing control functions in place at one or more facilities associated with the external entity. In such specific embodiments of the method, assessing the control functions may further include verifying that the external entity meets or exceeds (1) internal information security standards, (2) internal business privacy standards, (3) internal continuity standards, and (4) industry standards. While in other specific related embodiments of the method, managing the process for validating the external entity further includes assessing vulnerabilities associated with a data-hosting application implemented by the external entity to host the secure data.

In other specific embodiments of the method the triggering event is further defined as a contract-related activity, including one of (1) executing a new contract or statement-of-work with the external entity, (2) renewing a previously executed contract with the external entity, and (3) modifying an existing contract with the external entity.

In other specific embodiments the method includes managing a maintenance process for assuring that the external entity remains a validated external entity for electronically communicating the secure data to the external entity. In such embodiments of the invention managing the maintenance process further includes, in response to a triggering action or expiration of a validation period, generating and communicating, by a computing device processor, validation alerts that notify one or more parties that re-validation of the external entity is necessary.

Moreover, in other specific embodiments the method includes, in response to a triggering activity, managing a termination process that assures that the secure connection channel is deactivated.

A computer program product having a non-transitory computer-readable medium defines third embodiments of the invention. The computer-readable medium includes a first set of codes for causing a computer to, in response to a triggering event that requires electronic communication of secure data to an external entity, receive user inputs that define first information associated with the external entity and second information associated with the secure data. Additionally, the computer-readable medium includes a second set of codes for causing a computer to manage a process for validating the external entity for electronically communicating the secure data to the external entity, such that the process for validating is based at least in part on the first and second information. In addition the computer-readable medium includes a third set of codes for causing a computer to, in response to validating the external entity and granting permission to communicate the secure data, establish a secure communication channel to communicate the secure data to the external entity.

Thus, systems, apparatus, methods, and computer program products herein described in detail below provide for authorizing electronic communication of secure data to external entities, e.g., vendors, third parties or the like based on an assessment of the data risk associated with communicating the data to the external entity. Thus, embodiments of the invention provide efficiency, reliability and consistency to the process of validating external entities in terms of their capacity to receive and properly store and/or host secure data. Presently described embodiments identify the data that is be communicated and the associated security issues related to the data and assess the external entities ability to properly meet the enterprise/sender's information security, business privacy and continuity standards, along with applicable industry standards. Based on the results of the assessment, remediation action may be required to address critical vulnerabilities or recommendations may be presented to a decision-making entity (e.g., information security management) to grant authorization to electronically communicate the data in question to the external entity.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for authorizing electronic communication of confidential and/or proprietary data to external entities. In specific embodiments of the invention the communicator of the data is an enterprise, such as a financial institution and the data may be customer-related data, such as personal information, account information or the like. The external entity may be a vendor (i.e., an entity having a contractual relationship with the enterprise) or another third party that requires access to the data (i.e., an entity that is not contractually bound to the enterprise).

According to embodiments of the invention, a triggering event, such as a contract-related action (e.g., executing a contract or statement-of-work, modifying a contract, renewing a contract or the like) and the need for data to be transmitted acts as the impetus to initiating a validation process/assessment of the external entity. The external entity assessment requires knowledge of the data, specifically the data fields being communicated to the external entity and the mechanisms, procedures, governance and the like that the external entity has over the data once the data id received by the external entity. In the event that the external entity implements the data in an Internet or mobile application, the assessment may include proper mechanisms, procedures, governance to host the data in such a framework. If the results of the assessment show critical vulnerabilities, corrective actions may, and in some embodiments must, be implemented prior to recommending communication of the data. The results of the assessment are communicated to enterprise management, such as an information officer or the like, for granting/denying the right to electronically communicate the data to the external entity. Once approved, proper secure electronic communication channels are established to securely communicate the data to the external entity.

Additionally, embodiments of the present invention provide for ongoing assessments of the external entity throughout the life of the relationship between the external entity and the enterprise. Maintenance assessments or the like may be conducted on the external entity based on a predetermined time period lapse or the occurrence of a triggering event (e.g., a compromise at the external entity or the like). Off-boarding assessments or the like may be conducted on the external entity based on a triggering event, such as expiration/cancellation/invalidation of a contract. Such off-boarding assessments insure that data is properly and securely returned, purged or the like and that communication channels are terminated.

Figure 1:
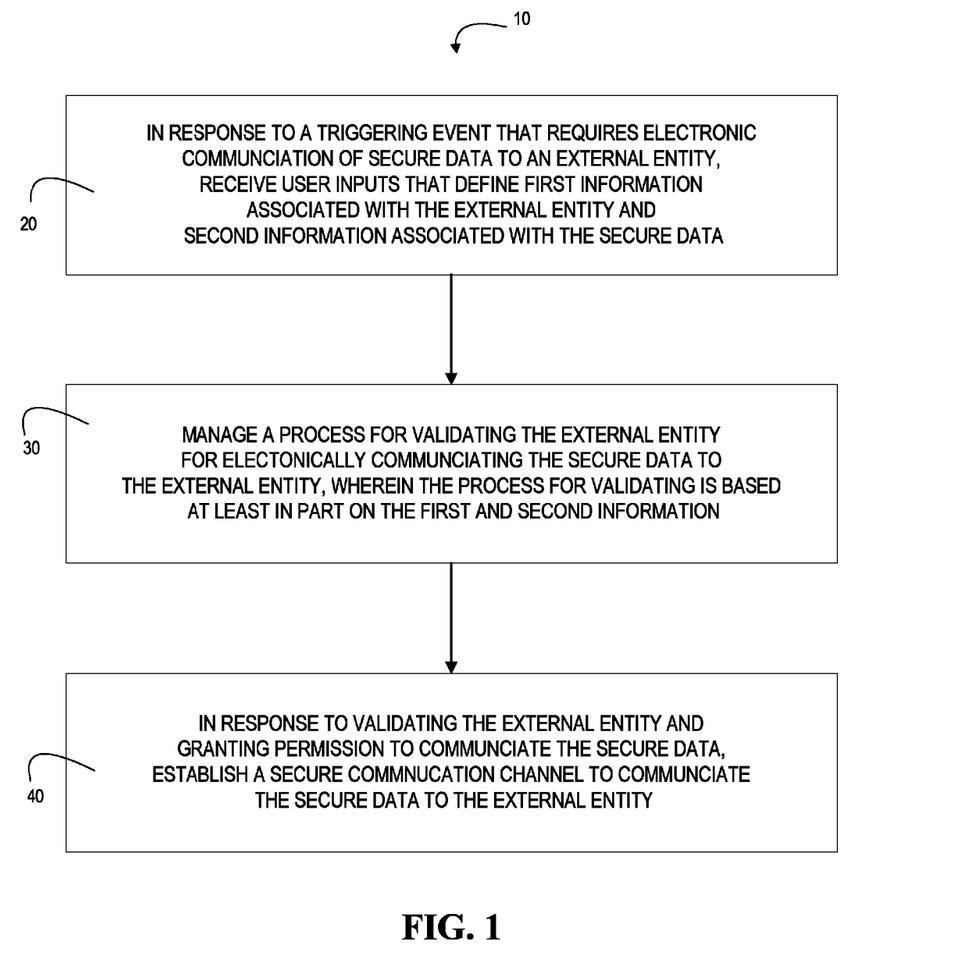
FIG. 1 provides a flow diagram of a method for granting authorization to electronically communicate secure data to an external entity, in accordance with embodiments of the present invention.

Referring to FIG. 1, a flow diagram is presented of a method 10 for granting authorization for electronic communication of data to an external entity, in accordance with embodiments of the present invention. At Event 20, in response to a triggering event that requires electronic communication of secure data to an external entity, user inputs are received at a data communication authorization application. The user inputs define first information associated with the external entity and second information associated with the secure data.

In specific embodiments of the method, in which the external entity is a vendor, the triggering event is a contract-related activity or other event/action that requires communication of secure data, such as (1) executing a contract or statement-of-work (SOW), (2) modifying a contract, (3) renewing a contract or the like. In other embodiment of the invention, in which the external entity is another third party that does have a contractual relationship with the enterprise (i.e., communicator of the secure data), the triggering event is any activity or event that requires communication of secure data.

In other specific embodiments of the method, the first information associated with the external entity includes external entity identifying information, such as name, enterprise-assigned ID, address and the like. In those embodiments in which the external entity is a vendor, the first information may include a contract number. Additionally, the first information may include internal and/or external contact information, such as, but not limited to, technical partner contact information, a sourcing manager contact information, a vendor manager and the like. In further specific embodiments of the method, the second information associated with the secure data includes, but is not limited to, information that identifies the type of data (e.g., corporate versus consumer, proprietary versus confidential, and the like); the specific data elements required to be communicated (e.g., social security numbers, names, home or business addresses, telephone numbers, account-related information and the like); the quantity of data/records required and the like.

At Event 30, a process is managed for validating the external entity for receiving the secure data. The process for validating the external entity is based, at least in part on the inputted first information (i.e., the vendor information) and second information (i.e., secure data information).

In specific embodiments of the method, the process for validating includes determining if (1) the external entity, and (2) the specific data elements in the secure data are currently approved (i.e., validated) for electronic communication of secure data to the external entity. In further embodiments of the invention, in which the external entity implements a data-hosting application (i.e., Internet-based, mobile or the like) to host the secure data, the determination additionally includes determining if (3) the data-hosting application is currently approved/validated. If it is determined that (1) the external entity, (2) the specific data elements in the secure data and, when applicable, (3) the data-hosting application are currently approved/validated, the triggering event may not require further validation (i.e., no onsite or otherwise assessment of the external entities control functions may be warranted at this time). For example, if the triggering event is a contract-related activity, such as executing a new contract, the new contract will not require further validation (i.e., assessment of the external entities control functions). It should be noted that "currency" of approval takes into account that, in certain embodiments of the invention, approval/validation of (1) the external entity, (2) the specific data elements in the secure data and/or (3) the data-hosting application will be for a predetermined period of time, such that once the pre-determined period of time lapse, the approval will lapse.

In specific embodiments of the method, if a determination is made that any one of (1) the external entity, or (2) the specific data elements in the secure data or, when applicable, (3) the data-hosting application is not currently approved for electronic communication of secure data to the external entity, an assessment of the control functions in place at the external entity is required. Such assessments, which may entail an onsite assessment, are undertaken to ensure that the external entity meets or exceeds the enterprise's standards for information security. In the financial institution environment such standards may include, but are not limited to, (1) information security standards, (2) business privacy standards, (3) continuity standards and, (4) industry standards, (e.g., payment card industry standards, mortgage industry standards and the like). In addition, in those embodiments of the invention, in which, upon receipt by the external entity, the secure data will be implemented in a data-hosting application (e.g., Internet-based, mobile application-based or the like) a vulnerability assessment of the application is conducted. It should be noted that vulnerability assessments of the control functions and vulnerability assessments of the data-hosting applications may occur in parallel.

If the results of the assessments identify critical (i.e., clear and present) vulnerabilities in any of the areas of the external entities control functions which would put the secure data at risk, the external entity is required to remediate the vulnerabilities before a recommendation can be made to information security management that the data is adequately protected at the external entity.

As a result of the validation assessments at the external entity, a recommendation is provided to information security management, such as a chief information officer associated with the line-of-business (i.e., the project owner). The recommendation provided to information security management may be either (1) external entity meets information security standards and communication of secure data is recommended, or (2) external entity fails to meet information security standards (post or pre-remediation) and communication of secure data is not recommended. Information security management may then accept the recommendation, i.e., authorize or deny communication of secure data to the external entity, or, in some embodiments, the information security management may override the recommendation (e.g., due to other business concerns, authorize communication of secure data to the external entity in the absence a recommendation that the entity meets requisite standards).

At Event 40, in response to validation/assessment of the external entity and granting of permission (i.e., management approval) to communicate the secure data, a secure communication channel is established between the enterprise and external entity to allow for the secure data to be securely communicated, on a one-time or ongoing basis, to the external entity.

Figure 2:
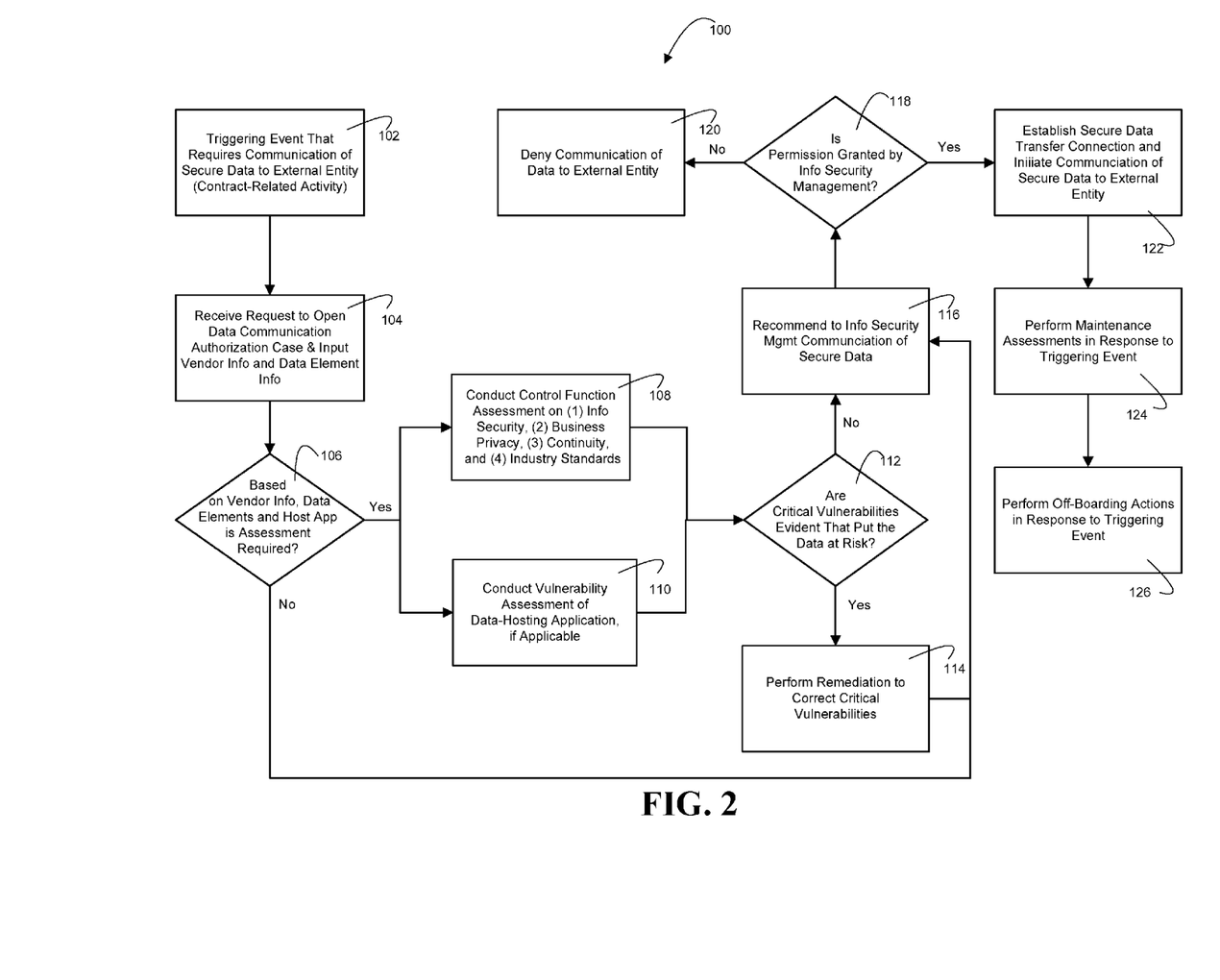
FIG. 2 provides a more detailed flow diagram of a method for granting authorization to electronically communicate secure data to an external entity, in accordance with embodiments of the present invention.

Referring to FIG. 2, a more detailed flow diagram is presented of a method for managing the validation of external entities for the purpose of communicating secure data to the entities, in accordance with embodiments of the present invention. At Event 102, a triggering event occurs that requires electronic communication of secure data to an external entity. As previously discussed the secure data may be proprietary and/or confidential information, for example in the financial institution environment the secure data may specifically be customer personal data or account-related data. The external entity may be a vendor having a contractual relationship with the enterprise/business or any other third party that requires the secure data. In those embodiments in which the external entity is a vendor the triggering act may be a contract-related activity/action, such as executing a new contract or SOW, modifying an existing contract or renewing a previous contract.

At Event 104, a request to open a data communication authorization case is received and external entity and data element information are inputted. In specific embodiments of the invention the occurrence of the triggering event may automatically request the opening of a data communication authorization request. For example, a system for managing contract formation between the enterprise and vendors may receive inputs that indicate that a contract/SOW is being initiated with a vendor and that such contract will require communication of electronic data from the enterprise to the external entity. The contract management system may be in network communication with the data communication authorization system of the present invention, such that the contract management system notifies the data communication authorization system of a need to open an authorization case and/or automatically opens such a case in the data communication authorization system. In the event that a case is automatically opened, the data communication authorization system may further be configured to notify predetermined personnel/users who are responsible for inputting the external entry information and data element information in the system. In still further embodiments of the invention, all or a portion of the external entity information and data element information may be communicated from and automatically inputted into the data communication authorization system from an ancillary system, such as a contract management system or the like.

At Decision 106, a determination is made as to whether an assessment of the external entity is required. The determination may be based on the external information, the data element information, and, when applicable, the data-hosting application implemented by the external entity. In specific embodiments of the invention, if the external entity and the data elements and, where applicable, the data-hosting application are all currently approved, no further assessment of the external entity's control functions are warranted and the method proceeds to Event 116 where a recommendation to validate/authorize the external entity to receive the secure data is provided to information security management. The determination that occurs at Decision 106 may occur automatically based on information provided to the data communication authorization system or the determination may be manual, in which instance information provided by the system may be relied upon.

If a determination is made that an assessment is required at Event 108, a control function assessment is undertaken to assess the risk to the data in terms of the external entities ability to meet (1) information security, (2) business privacy, (3) continuity, and (4) industry standards. Further at Event 110, if the secure data is to be implemented by the external entity in an Internet-based or mobile-based application, a vulnerability assessment of the data-hosting application is undertaken to assess the risk/vulnerabilities associated with the application. It should be noted that while the assessments are shown to occur in parallel, in practice the assessments may occur simultaneously or sequentially. In specific embodiments the assessments may be manual, requiring designated personnel to make an onsite visit to the external entity. In other embodiments of the invention, the assessment may be fully or partially automated. For example, the data communication authorization system may include a database of external entities current control functions. While in other embodiments of the invention, an assessment notification may go out to the external entity with instructions for self-assessment and/or for the external entity to upload assessment documentation to a review portal for designated enterprise personnel to review as a means of conducting, at least a portion of the assessment.

At Decision 112, a determination is made as to whether any critical vulnerabilities are evident in the control function and/or the data-hosting hosting application(s) which would put the secure data at risk. According to specific embodiments, such determinations may be automated and/or made manually. If critical vulnerabilities are identified/determined, at Event 114, remedial actions are performed to address and/or correct the critical vulnerabilities. In the event that the remedial actions are unable to correct the critical vulnerabilities, the recommendation that is subsequently provided to IS management, at Event 116, may be a recommendation to not proceed with authorizing the electronic communication of the data to the external entity. If no critical vulnerabilities are identified, at Event 116, a recommendation is provided to IS management to allow for the electronic communication of the data to the external entity.

At Event 118, a determination is made, based on the recommendation, whether to grant authorization/permission to communicate the date to the external entity. In specific embodiments of the invention the determination is made manually by designated personnel within information security management. In such embodiments, the invention may provide for a portal/dashboard that the user may access to render such decisions. The portal/dashboard may be configured to status all pending decisions and provide the user/decisioner with network access to all information relevant to making the decision (e.g., assessment results, critical vulnerabilities, corrective actions performed, outstanding issues/vulnerabilities and the like). In certain embodiments in which the assessments result in a recommendation to not proceed with communication of the data to the external entity, the user/decisioner may override the recommendation based on a business decision or the like. In such instances, the user/decisioner provides inputs to the system that record the reasons for the override. In other embodiment of the invention the determination as to whether to grant permission/authorize the communication of the data may be an automated decision based on the results of the assessment.

If permission is not granted, at Event 120, communication of the secure data is denied. In those embodiments in which a contract is being executed, modified or renewed denial of the data communication may cause the contract to be avoided or modified. If permission is granted at Event 124, information technology personnel are relied upon to establish a secure data transmission connection with the external entity and communication of the data is initiated. In specific instances the data communication may be one-time-only, however; in many instances the data communication will occur over time, either on demand, on a regular schedule or automatically based on generation of the data, for example, for the life of the contract.

Additionally, once authorization has been provided to communicate the secure data to the external entity, at Event 124, periodical maintenance assessments may be performed to assure that the external entity is currently adhering to control function and data-hosting application standards. In specific embodiments a triggering event may prompt a maintenance assessment. The triggering event may be lapse of specified time period (e.g., every six months, every twelve months or the like), notification of a change in data-hosting applications, notification of a compromise/breach at the external entity or the like. The subsequent maintenance assessment may be automated, manual or a combination of manual and automated assessments. If critical vulnerabilities are identified during the maintenance corrective action will be required. The results of the maintenance assessments may be presented to information security management for denial/approval of continued authorization to communicate the secure data. In specific embodiments, if continued authorization/validation is denied, the denial may invalidate/cancel the contract or require modification of the contract.

At Event 126, at the expiration of the lifecycle of the relationship with the external entity and/or expiration of the contract associated with the need to communicate the data, off-boarding is performed which assures that the secure connection is terminated with the external entity and assures that the external entity has either properly returned secure data to the enterprise and/or purged/deleted the data from storage locations.

Figure 3:
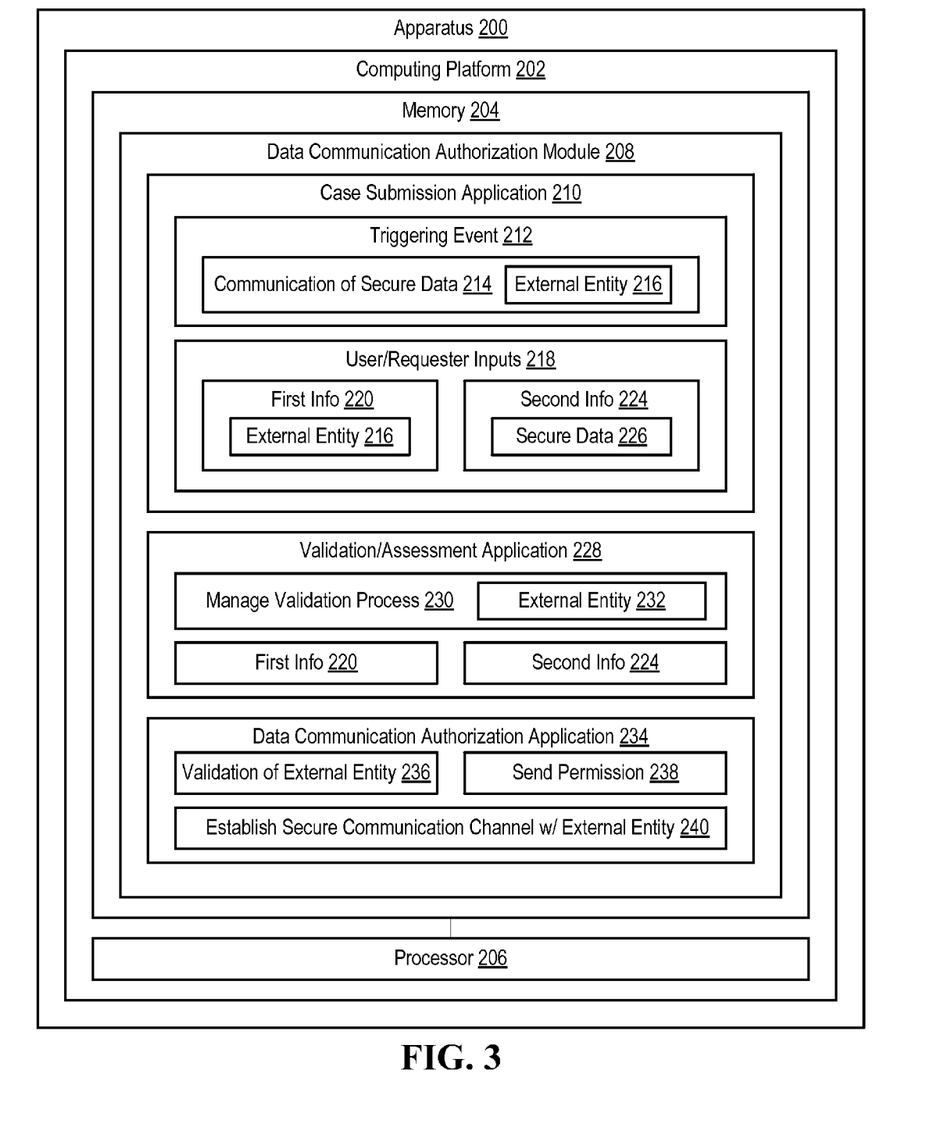
FIG. 3 provides a block diagram of an apparatus configured for granting authorization to electronically communicate secure data to an external entity, in accordance with embodiments of the present invention.

Referring to FIG. 3, a block diagram is presented of an apparatus 200 configured for granting authorization to electronically communicate secure data to an external entity, in accordance with embodiments of the present invention. The apparatus includes a computing platform 202 having a memory 204 and at least one processor 206 in communication with the memory. The apparatus 200 which may include more than one physical device or unit is operable to receive and execute modules, routines and applications, such as data communication authorization module 208 and the like.

The module 208 includes case submission application 210 that is configured to, in response to a triggering event 212 that requires electronic communication of secure data 214 to an external entity 216, receive case requester (i.e., user) inputs 218 that define first information 220 associated with the external entity 216 and second information associated with the secure data 226.

As previously discussed, in specific embodiments of the apparatus, in which the external entity 216 is a vendor, the triggering event 212 is a contract-related activity or action that requires communication of secure data 214. In other embodiment of the invention, in which the external entity is another third party that does have a contractual relationship with the enterprise (i.e., communicator of the secure data), the triggering event 212 is any activity or event that requires communication of secure data 214.

The module 208 additionally includes validation/assessment application 228 that is configured to manage and track a process for validating/authorizing 230 the external entity 216 to receive the secure data 226. The process for validating 230 the external entity 216 is based, at least in part on the inputted first information 220 (i.e., the vendor information) and second information (i.e., secure data information) 224. The validation/assessment application 228 provides for capturing, storing and tracking the results of any assessments of the external entity required to validate the external entity.

As previously discussed in specific embodiments of the apparatus, a manual, automated or blended manual and automated assessment of the control functions in place at the external entity is required. Such assessments, which may entail an onsite assessment, are undertaken to ensure that the external entity meets or exceeds the enterprise's standards for information security. In the financial institution environment such standards may include, but are not limited to, (1) information security standards, (2) business privacy standards, (3) continuity standards and, (4) industry standards, (e.g., payment card industry standards, mortgage industry standards and the like). In addition, in those embodiments of the invention, in which, upon receipt by the external entity, the secure data will be implemented in a data-hosting application (e.g., Internet-based, mobile application-based or the like) a vulnerability assessment of the application is conducted. It should be noted that vulnerability assessments of the control functions and vulnerability assessments of the data-hosting applications may occur in parallel.

If the results of the assessments identify critical (i.e., clear and present) vulnerabilities in any of the areas of the external entities control functions which would put the secure data at risk, the external entity is required to remediate the vulnerabilities before a recommendation can be made to information security management that the data is adequately protected at the external entity.

The module 208 additionally includes data communication application 234 that is configured to, in response to validating 236 the external entity and granting permission 238 to communicate the secure data, manage a process for establishing a secure communication channel 240 with the external entity that is established between the enterprise and external entity to allow for the secure data to be securely communicated, on a one-time or ongoing basis, to the external entity.

Figure 4:
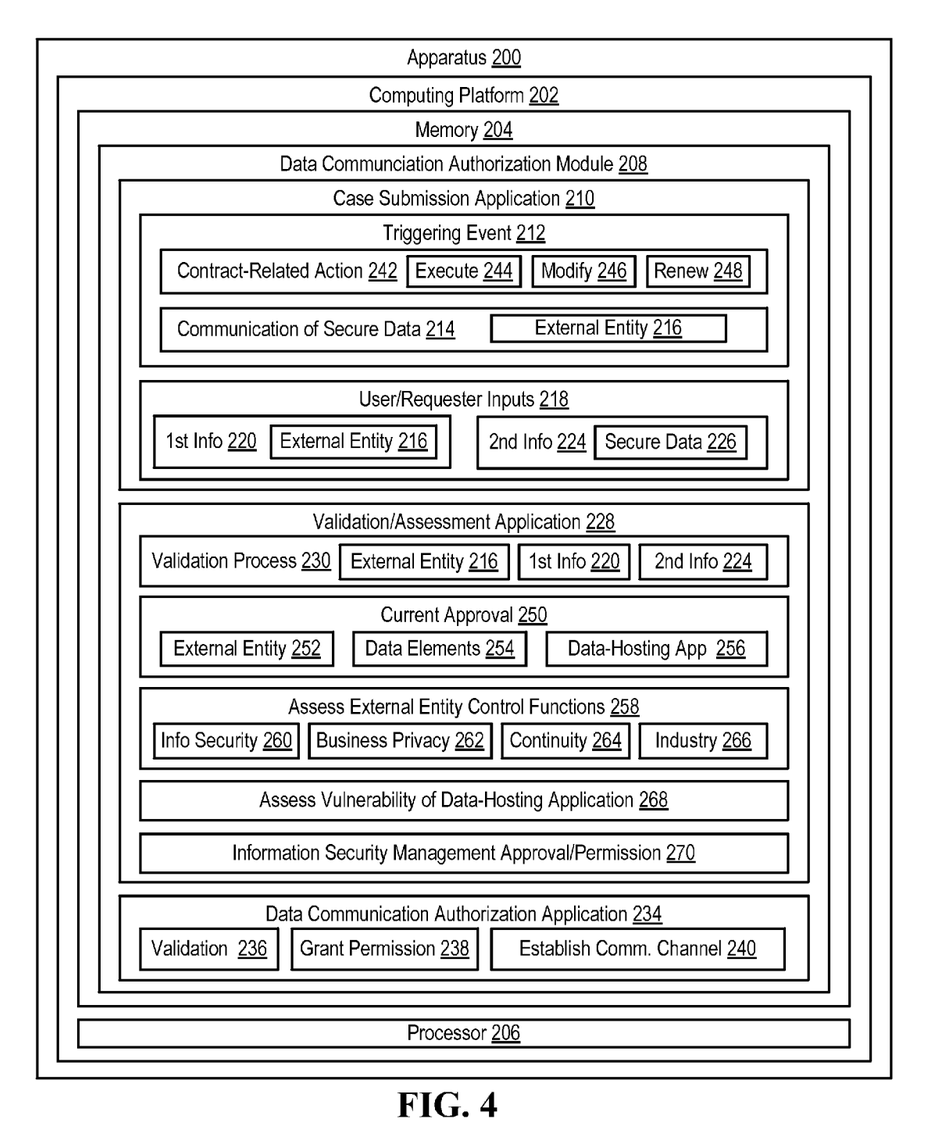
FIG. 4 provides a more detailed block diagram of the apparatus configured for granting authorization to electronically communicate secure data to an external entity, in accordance with embodiments of the present invention.

Referring to FIG. 4 a more detailed block diagram is presented of the apparatus 10, which is configured for scheduling, allocating and tracking work assignments, in accordance with embodiments of the present invention. In addition to providing greater detail, FIG. 4 highlights various alternate embodiments of the invention. The apparatus 200 may include one or more of any type of computing device. The present apparatus and methods can accordingly be performed on any form of one or more computing devices.

The apparatus 200 includes computing platform 202 that can receive and execute algorithms, such as routines, and applications. Computing platform 202 includes memory 204, which may comprise volatile and non-volatile memory, such as read-only and/or random-access memory (RAM and ROM), EPROM, EEPROM, flash cards, or any memory common to computer platforms. Further, memory 204 may include one or more flash memory cells, or may be any secondary or tertiary storage device, such as magnetic media, optical media, tape, or soft or hard disk.

Further, computing platform 202 also includes processor 206, which may be an application-specific integrated circuit ("ASIC"), or other chipset, processor, logic circuit, or other data processing device. Processor 206 or other processor such as ASIC may execute an application programming interface ("API") (not shown in FIG. 4) that interfaces with any resident programs, such as data communication authorization module 208 and routines, sub-modules associated therewith or the like stored in the memory 204 of the apparatus 200.

Processor 206 includes various processing subsystems (not shown in FIG. 4) embodied in hardware, firmware, software, and combinations thereof, that enable the functionality of apparatus 200 and the operability of the apparatus on a network. For example, processing subsystems allow for initiating and maintaining communications and exchanging data with other networked devices. For the disclosed aspects, processing subsystems of processor 206 may include any subsystem used in conjunction with data communication authorization module 208 and related algorithms, sub-algorithms, sub-modules thereof.

Computer platform 202 may additionally include communications module (not shown in FIG. 2) embodied in hardware, firmware, software, and combinations thereof, that enables communications among the various components of the apparatus 200, as well as between the other networked devices. Thus, communication module may include the requisite hardware, firmware, software and/or combinations thereof for establishing and maintaining a network communication connection.

As previously discussed in relation to FIG. 3, the memory 204 of apparatus 200 stores data communication authorization module 208. The module 208 includes case submission application 210 that is configured to, in response to a triggering event 212 that requires electronic communication of secure data 214 to an external entity 216, receive case requester (i.e., user) inputs 218 that define first information 220 associated with the external entity 216 and second information associated with the secure data 226.

As previously discussed, in specific embodiments of the apparatus, in which the external entity 216 is a vendor, the triggering event 212 is a contract-related activity or action that requires communication of secure data 214, such as executing a contract (or Statement-Of-Work) 244, modifying a contract 246 or renewing a contract 248. In other embodiments of the invention, in which the external entity is another third party that does not have a contractual relationship with the enterprise (i.e., communicator of the secure data), the triggering event 212 is any activity or event that requires communication of secure data 214.

In other specific embodiments of the apparatus, the first information 220 associated with the external entity 216 includes external entity identifying information, such as name, enterprise-assigned ID, address and the like. In those embodiments in which the external entity 216 is a vendor, the first information 220 may include a contract number. Additionally, the first information 220 may include internal and/or external contact information, such as, but not limited to, technical partner contact information, a sourcing manager contact information, a vendor manager and the like. In further specific embodiments of the apparatus, the second information 224 associated with the secure data 226 includes, but is not limited to, information that identifies the type of data (e.g., corporate versus consumer, proprietary versus confidential, and the like); the specific data elements required to be communicated (e.g., social security numbers, names, home or business addresses, telephone numbers, account-related information and the like); the quantity of data/records required and the like.

The module 208 additionally includes validation/assessment application 228 that is configured to manage and track a process for validating/authorizing 230 the external entity 216 to receive the secure data 226. The process for validating 230 the external entity 216 is based, at least in part on the inputted first information 220 (i.e., the vendor information) and second information (i.e., secure data information) 224. The validation/assessment application 228 provides for capturing, storing and tracking the results of any assessments of the external entity required to validate the external entity.

In specific embodiments of the apparatus, the validation process 230 includes determining if (1) the external entity 216, and (2) the specific data elements 254 in the secure data 226 are currently approved (i.e., validated) for electronic communication of secure data 214 to the external entity 216. In further embodiments of the invention, in which the external entity 216 implements a data-hosting application 256 (i.e., Internet-based, mobile or the like) to host the secure data 226, the determination additionally includes determining if (3) the data-hosting application 256 is currently approved/validated. If it is determined that (1) the external entity 216, (2) the specific data elements 254 in the secure data and, when applicable (3) the data-hosting application 256 are currently approved/validated, the triggering event 212 may not require further validation (i.e., no onsite or otherwise assessment of the external entities control functions may be warranted at this time). For example, if the triggering event 212 is a contract-related activity 242, such as executing a new contract, the new contract will not require further validation (i.e., assessment of the external entities control functions). It should be noted that "currency" of approval takes into account that, in certain embodiments of the invention, approval/validation of (1) the external entity 216, (2) the specific data elements 254 in the secure data and/or (3) the data-hosting application 256 will be for a predetermined period of time, such that once the predetermined period of time lapse, the approval will lapse.

In specific embodiments of the method, if a determination is made that any one of (1) the external entity 216, or (2) the specific data elements 254 in the secure data or, when applicable, (3) the data-hosting application 256 is not currently approved for electronic communication of secure data to the external entity, an assessment of the control functions 258 in place at the external entity is required. Such assessment 258, which may entail an onsite assessment, is undertaken to ensure that the external entity meets or exceeds the enterprise's standards for information security. In the financial institution environment such standards may include, but are not limited to, (1) information security standards 260, (2) business privacy standards 262, (3) continuity standards 264 and, (4) industry standards 266, (e.g., payment card industry standards, mortgage industry standards and the like). In addition, in those embodiments of the invention, in which, upon receipt by the external entity 216, the secure data 226 will be implemented in a data-hosting application 256 (e.g., Internet-based, mobile application-based or the like) a vulnerability assessment of the application 268 is conducted. It should be noted that vulnerability assessments of the control functions and vulnerability assessments of the data-hosting applications may occur in parallel.

If the results of the assessments identify critical (i.e., clear and present) vulnerabilities in any of the areas of the external entities control functions which would put the secure data at risk, the external entity is required to remediate the vulnerabilities before a recommendation can be made to information security management that the data is adequately protected at the external entity.

The validation/assessment application 228 is further configured to receive management permission/approval 270 to authorize the communication of the secure data. In such embodiments, the validation/assessment application may provide for a portal/dashboard that the user may access to render such decisions. The portal/dashboard may be configured to status all pending decisions and provide the user/decisioner with network access to all information relevant to making the decision (e.g., assessment results, critical vulnerabilities, corrective actions performed, outstanding issues/vulnerabilities and the like). In certain embodiments in which the assessments result in a recommendation to not proceed with communication of the data to the external entity, the user/decisioner may override the recommendation based on a business decision or the like. In such instances, the user/decisioner provides inputs to the system that record the reasons for the override. In other embodiment of the invention the determination as to whether to grant permission/authorize the communication of the data may be an automated decision based on the results of the assessment.

The module 208 additionally includes data communication application 234 that is configured to, in response to validating 236 the external entity granting permission 238 to communicate the secure data, manage a process for establishing a secure communication channel 240 with the external entity that is established between the enterprise and external entity to allow for the secure data to be securely communicated, on a one-time or ongoing basis, to the external entity.

In further embodiments of the apparatus, the module 208 includes a maintenance application (not shown in FIG. 4) configured for managing a maintenance process for assuring that the external entity remains a validated external entity for electronically communicating the secure data to the external entity. As such, periodic assessments may be required to re-validate the external entity, data elements or data-hosting based on the occurrence of a triggering event. The triggering event may be the lapse of a predetermined time period, notification of a compromise/breach at the external entity, an update to the data-hosting application, a new data-hosting application or the like. In specific embodiments of the invention, maintenance application may be configured to, in response to a triggering action or expiration of a validation period, generating and communicating validation alerts that notify one or more parties that re-validation/re-assessment of the external entity is necessary.

Moreover, in further embodiments of the apparatus, the module 208 includes an off-boarding application (not shown in FIG. 4) configured for, in response to a triggering activity, managing a termination process that assures that the secure connection channel is deactivated and that the secure data is returned to the enterprise or purged/deleted or otherwise properly disposed of at the external entity. In such embodiments of the invention, the triggering activity may be one of (1) a contract expiring, (2) cancellation of a contract, or (3) a critical security compromise/breach by the external entity or the like.

Thus, systems, apparatus, methods, and computer program products described above provide for authorizing electronic communication of secure data to external entities, e.g., vendors, third parties or the like based on an assessment of the data risk associated with communicating the data to the external entity. Thus, embodiments of the invention provide efficiency, reliability and consistency to the process of validating external entities in terms of their capacity to receive and properly store and/or host secure data. Presently described embodiments identify the data that is be communicated and the associated security issues related to the data and assess the external entities ability to properly meet the enterprise/sender's information security, business privacy and continuity standards, along with applicable industry standards. Based on the results of the assessment, remediation action may be required to address critical vulnerabilities or recommendations may be presented to a decision-making entity (e.g., information security management) to grant authorization to electronically communicate the data in question to the external entity.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for granting authorization to electronically communicate secure data to an external entity, the apparatus comprising:
    a computing platform having a memory and at least one processor in communication with the memory; and
    a data communication authorization module stored in the memory, executable by the processor and including:
        a case submission application configured for, in response to a triggering event that requires electronic communication of secure data to an external entity, receiving user inputs that define first information associated with the external entity and second information associated with the secure data,
        a validation application configured for performing a process for validating the external entity for electronically communicating the secure data to the external entity, wherein the process for validating is performed in automatic response to receiving the user inputs and includes:
            accessing a first database to determine that the (i) the external entity, (ii) data elements in the secure data, and (iii) a data-hosting application implemented by the external entity are currently validated for electronic communication of the secure data to the external entity;
            in automatic response to determining that at least one of (i) the external entity, (ii) the data elements in the secure data, and (iii) the data-hosting application implemented by the external entity are currently not validated for electronic communication of the secure data to the external entity, accessing a second database of external entity current control functions to (a) verify that the external entity meets internal (1) information security standards, (2) privacy standards, and (3) continuity standards, and (b) assess vulnerabilities associated with a data-hosting application implemented by the external entity in hosting the secure data,
        a data transmission application configured for, in response to validating the external entity and granting permission to communicate the secure data, manage a process for establishing a secure communication channel to communicate the secure data to the external entity, and
        an off-boarding application configured for, in response to a second triggering activity, managing a termination process that assures that the secure connection channel is deactivated.

2. The apparatus of claim 1, wherein, in response to determining that at least one of (i) the external entity, (ii) the data elements in the secure data, and (iii) the data-hosting application implemented by the external entity are currently not validated for electronic communication of the secure data to the external entity, the process for validating the external entity further comprises assessing control functions in place at one or more facilities associated with the external entity.

3. The apparatus of claim 2, wherein accessing the second database of external entity current control functions further comprises accessing the second database of external entity current control functions to verify that the external entity meets or exceeds industry standards.

4. The apparatus of claim 1, wherein the triggering event is further defined as a contract activity, including one of (1) executing a new contract or statement-of-work with the external entity, (2) re-newing a previously executed contract with the external entity, and (3) modifying an existing contract with the external entity.

5. The apparatus of claim 1, wherein the data communication authorization module further comprises a maintenance application configured for managing a maintenance process for assuring that the external entity remains a validated external entity for electronically communicating the secure data to the external entity.

6. The apparatus of claim 5, wherein the maintenance application is further configured for, in response to a triggering action or expiration of a validation period, generating and communicating validation alerts that notify one or more parties that re-validation of the external entity is necessary.

7. The apparatus of claim 1, wherein the second triggering activity is one of (1) a contract expiring, (2) cancellation of a contract, or (3) a security compromise by the external entity.

8. A method for granting authorization to electronically communicate secure data to an external entity, the method comprising:
    in response to a triggering event that requires electronic communication of secure data to an external entity, receiving, by a computing device processor, user inputs that define first information associated with the external entity and second information associated with the secure data;
    in automatic response to receiving the user inputs, performing a process for validating the external entity for electronically communicating the secure data to the external entity by:
        accessing a first database to determine that the (i) the external entity, (ii) data elements in the secure data, and (iii) a data-hosting application implemented by the external entity are currently validated for electronic communication of the secure data;
        in automatic response to determining that at least one of (i) the external entity, (ii) the data elements in the secure data, and (iii) the data-hosting application implemented by the external entity are currently not validated for electronic communication of the secure data, accessing a second database of external entity current control functions to (a) verify that the external entity meets internal (1) information security standards, (2) privacy standards and (3) continuity standards, and (b) assess vulnerabilities associated with a data-hosting application implemented by the external entity in hosting the secure data;
    in response to validating the external entity and granting permission to communicate the secure data, managing a process for establishing a secure communication channel to communicate the secure data to the external entity; and
    in response to a second triggering activity, managing a termination process that assures that the secure connection channel is deactivated.

9. The method of claim 8, wherein in response to determining that at least one of (i) the external entity, (ii) the data elements in the secure data, and (iii) the data-hosting application implemented by the external entity are currently not validated for electronic communication of the secure data to the external entity, assessing control functions in place at one or more facilities associated with the external entity.

10. The method of claim 9, wherein accessing the second database of external entity current control functions further comprises accessing the second database of external entity current control functions to verify that the external entity meets or exceeds industry standards.

11. The method of claim 8, wherein the triggering event is further defined as a contract activity, including one of (1) executing a new contract or statement-of-work with the external entity, (2) renewing a previously executed contract with the external entity, and (3) modifying an existing contract with the external entity.

12. The apparatus of claim 1, further comprises managing a maintenance process for assuring that the external entity remains a validated external entity for electronically communicating the secure data to the external entity.

13. The apparatus of claim 12, wherein managing the maintenance process further comprises, in response to a triggering action or expiration of a validation period, generating and communicating, by a computing device processor, validation alerts that notify one or more parties that re-validation of the external entity is necessary.

14. A computer program product comprising:
a non-transitory computer-readable medium comprising:
a first set of codes for causing a computer to, in response to a triggering event that requires electronic communication of secure data to an external entity, receive user inputs that define first information associated with the external entity and second information associated with the secure data;
a second set of codes for causing a computer to, in automatic response to receiving the user inputs, perform a process for validating the external entity for electronically communicating the secure data to the external entity by:
accessing a first database to determine that the (i) the external entity, (ii) data elements in the secure data, and (iii) a data-hosting application implemented by the external entity are currently validated for electronic communication of the secure data;
in automatic response to determining that at least one of (i) the external entity, (ii) the data elements in the secure data, and (iii) the data-hosting application implemented by the external entity are currently not validated for electronic communication of the secure data, accessing a second database of external entity current control functions to (a) verify that the external entity meets internal (1) information security standards, (2) privacy standards and (3) continuity standards, and (b) assess vulnerabilities associated with a data-hosting application implemented by the external entity in hosting the secure data;
a third set of codes for causing a computer to, in response to validating the external entity and granting permission to communicate the secure data, mange a process for establishing a secure communication channel to communicate the secure data to the external entity; and
a fourth set of codes for causing a computer to, in response to a second triggering activity, manage a termination process that assures that the secure connection channel is deactivated.

* * * * *